Feb. 4, 1936.  C. F. MOODY ET AL  2,029,435
APPARATUS FOR PRODUCING SHEATHED ARTICLES
Filed Oct. 2, 1934    2 Sheets-Sheet 1
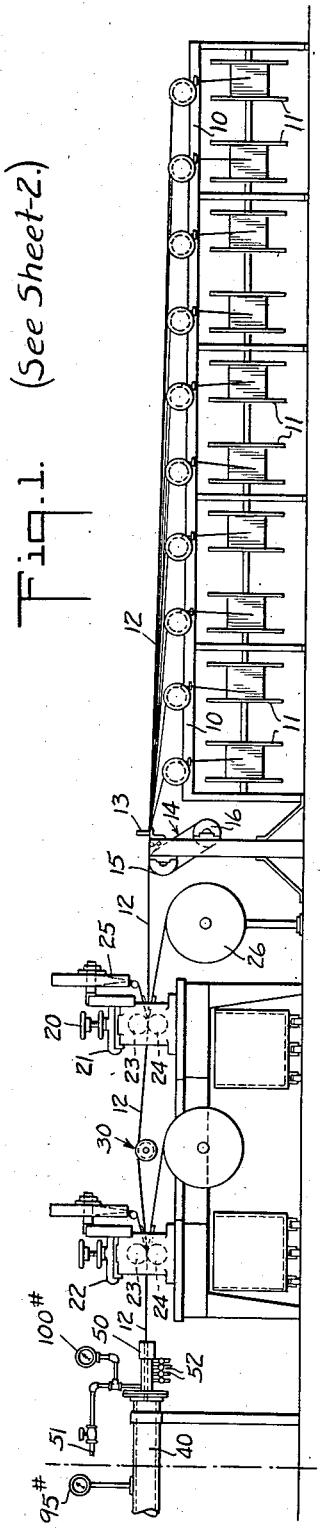
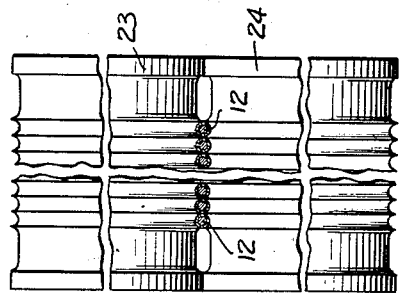
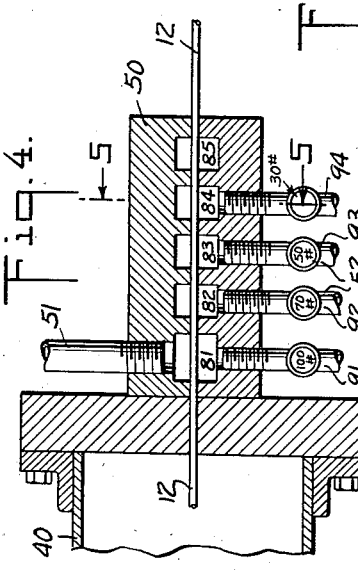
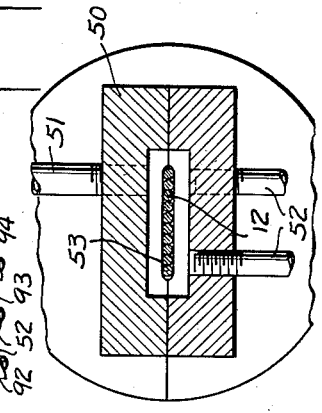
CHARLES F. MOODY
and
EARLE A. MITCHELL
INVENTORS
BY
ATTORNEY Feb. 4, 1936.  C. F. MOODY ET AL  2,029,435
APPARATUS FOR PRODUCING SHEATHED ARTICLES
Filed Oct. 2, 1934  2 Sheets-Sheet 2
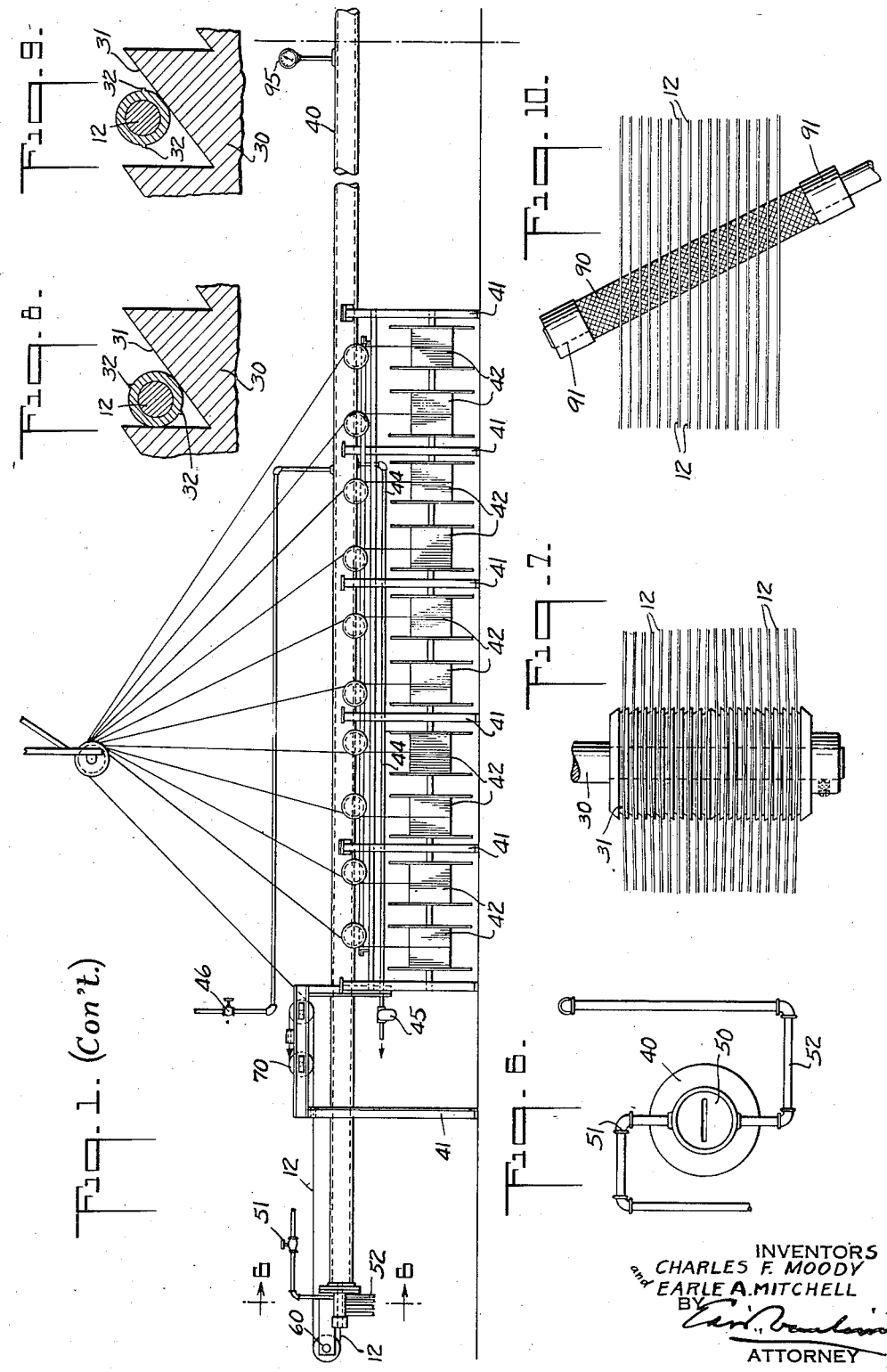
INVENTORS
CHARLES F. MOODY
and EARLE A. MITCHELL
BY
ATTORNEY Patented Feb. 4, 1936

2,029,435

UNITED STATES PATENT OFFICE 2,029,435

APPARATUS FOR PRODUCING SHEATHED ARTICLES

Charles F. Moody, Yonkers, and Earle A. Mitchell, Hastings-on-the-Hudson, N. Y., assignors to Phelps Dodge Copper Products Corporation, New York, N. Y., a corporation of Delaware Application October 2, 1934, Serial No. 746,486

6 Claims. (Cl. 18—6)

Our invention relates to a machine for handling strand and/or strip material, more particularly to a machine for handling a plurality of moving wires during the process of continuously applying individual insulation around the wires and simultaneously vulcanizing the insulating coatings upon the wires.

An object of the invention is to produce a plurality of individually insulated and vulcanized wires in a simple, expeditious and economical manner.

It has hitherto been the practice to take a single wire and extrude a coating of vulcanizable material upon the wire, pass the wire thus coated directly through a vulcanizer without contact with the air to cure the insulation. While this is quite a satisfactory method of insulating wire with rubber, many obstacles arise when it is attempted to handle in that manner a plurality of wires at the same time and in one operation, especially when it is desired to have each wire with an independent sheathing or covering of rubber. The object of the invention is therefore, to overcome these obstacles and to produce a machine that will handle forty to a hundred wires as simply as heretofore one has been handled by the old method and to produce a vulcanizer that will retain the vulcanizing medium without loss and to insulate a multiplicity of wires in an expeditious and practical manner.

The foregoing and other features of our invention will now be described in connection with the accompanying drawings forming part of this specification in which we have represented our apparatus in its preferred form, after which we shall point out more particularly in the claims those features which we believe to be new and of our own invention.

In the drawings:

Figure 1 is a diagrammatic side view of the entire apparatus from the supply reels 11 of plain wire on the right to the reels of finished insulated wire 42 on the left. For convenience in illustration, this diagram is divided in the middle and illustrated on two sheets.

Figure 2 is an enlarged detail of the capstan for producing even tension on the wires to be insulated.

Figure 3 is an enlarged view of the stripper rolls at right angles to their position as shown in Figure 1.

Figure 4 is an enlarged detail of our water gland at inlet end of vulcanizer.

Figure 5 is a section on line 5—5, Figure 4.

Figure 6 is an end view of the vulcanizer.

Figure 7 is an enlarged detail of the seam turner.

Figures 8 and 9 show method of turning wire between the stages of stripping.

Figure 10 is a modification of my seam turner.

In the drawings, we have illustrated a rack 10 arranged to accommodate ten supply reels 11, but in our preferred practice we intend to operate with forty reels. However, we do not wish to limit ourselves to that number and it may even be practical to handle over a hundred individual reels of wire in one operation. The wires 12 are passed from these reels through friction 13 which may be any means for putting a resisting pull on each wire. In the friction shown, the wires run between two blocks 17 and 18 faced with rubber which are clamped together to give the resistance desired. The wires then pass over the capstan 14, passing around the rolls 15 and 16 which not only delivers the wires with even tension but straightens them. From here the straightened wires are fed to the stripper 20 which may be of any well known type of stripping device.

The stripping device 20 as shown, comprises two stations 21 and 22, both identical in operation and are used to put on two independent layers of rubber strip insulation. Each station has two rolls 23, 24 carrying on the periphery of each a plurality of grooves with sharp shearing edges between adjacent grooves. Two rolls of rubber strip 25 and 26 are mounted in any convenient manner so that the strip from roll 25 will be fed into the rolls 23, 24 on the top of the plurality of wires 12, while the strip from the roll 26 will be fed into the rolls 23, 24 on the under side of the plurality of wires 12. In this manner the rubber strips are fed into the first stage of the stripper and the rubber is rolled into the grooves of the rolls and is firmly packed around each individual wire while the edges of the grooves sever the rubber strips so that each wire emerges from this stage of the stripper with a complete covering layer of rubber insulation. Between the first and second stage we may provide a device which we call our seam turner 30. One modification which we may employ comprises a roller having a plurality of grooves 31 provided with inclined planes and mounted to revolve so that the upper horizontal periphery of the roll is slightly above the direct line of travel of the wires 12. When each wire 12, which has had its first covering of rubber insulation, approaches the groove, the seams of the covering have the relative position to the groove as shown in Figure 9. The seams 32 are in a horizontal position. After the wire passes over the roll, the relative position is as shown in Figure 8, because of the tendency of the wire 12 when tense or taut to slide down the incline 31 causing the rubber covering to turn on the longitudinal axis.

The seams 32 are now in a vertical position or substantially 90 degrees from the position at the first stripper stage, and in this position the wire enters the second stage of the stripper in which it receives another covering of rubber strip in the same manner described for the first stage.

In order to turn the cores between application of rubber covering so that the succeeding covering of rubber laps the longitudinal seams, we may employ a corrugated roller 90 mounted to turn in bearing 91, the axis being located so that the roll will rotate at an angle to the longitudinal axis of the wires 12. This roller may be used in place of the saw tooth grooved roller 30 and is located between the stripper stations in the position occupied by roll 30. It will be readily apparent that the friction between wires and the corrugated surface of the roll will turn the rubber covering upon the core in the same manner as described heretofore so that the subsequent covering of rubber will cover the seam of the former covering.

It is readily understood that the rubber may be placed on the wire in any number of layers and not confined to the two layer practice as described above.

From here the wires with the rubber covering are put through a vulcanizer. The vulcanizing chamber 40 is supported by a series of standards 41 which are also used to provide supporting means for the reels of the finished insulated wire 42. The vulcanizing chamber is provided with an inlet pipe 43 and outlet pipe 44 with suitable fittings 45, 46 for conveying a heated vulcanizing medium such as steam or hot air under pressure into and out of the chamber.

At the ends of the vulcanizing chamber we provide water glands 50 with multi-stage pressure reduction and supplied with water inlet 51 and outlets 52. These chambers are supplied with water pressure and each has outlets with blow off valves 91, 92, 93, 94. These valves are set so that the difference in pressure between each pair of adjacent chambers is less than 40 pounds.

It is evident that the chambers and slots can be so designed that the differential drop in pressure from the 100 pounds in chamber 81 to atmosphere in chamber 85 will be uniform and gradual without the use of the blow off valves.

We may employ a similar water gland on the outlet end of the vulcanizer, but so many stages in reduction of pressure are not necessary because the rubber insulation on the wire at this point is cured and can stand more severe handling.

We have discovered that with a water pressure of substantially 100 pounds on the gland, it will nicely balance a steam pressure of 95 pounds within the vulcanizer so that none of the vulcanizing medium will escape. What little water that enters the vulcanizer around the wires goes off into steam or is drawn off through outlet provided for the purpose to take care of any condensation.

We have also discovered that in drawing a wire with rubber cover to be vulcanized into a chamber where the pressure differential is over 40 pounds the rubber will be ripped off the wire and that the smaller the drop in pressure between chambers within the gland the better the quality of insulation.

We therefore use, at least on the entering end of the vulcanizer, a gland 50 provided with a plurality of chambers 81, 82, 83, 84, 85 through which the wire 12 covered with rubber strip passes upon entering the vulcanizing chamber 40.

At the far end of the vulcanizing chamber means 60 are provided to direct the wires to a pulling capstan 70; from there the individual wires are led to the individual reels 42 where the wires are stored until used.

We wish it distinctly understood that our apparatus herein described and illustrated is in the form in which we desire to construct it and that changes or variations may be made as may be convenient or desirable without departing from the salient features of our invention and we therefore intend the following claims to cover such modifications as naturally fall within the lines of invention.

We claim:

1. In an apparatus for producing sheathed articles, a device for handling a plurality of moving cores, a device for applying individual insulation simultaneously to each core by the strip method whereby two seams are formed in the insulation, a device for turning the insulation, a device for applying a second coating so that the seams in the first coating are over-lapped by the second coating, a vulcanizing chamber, means for advancing the sheathed cores in parallel through the chamber for vulcanizing the insulation, means for admitting a hot vulcanizing medium into the chamber, a seal at each end of the vulcanizing chamber having means to permit the passage of the sheathed cores, while preventing the escape of vulcanizing medium.

2. In an apparatus for covering a core with a vulcanizable material, means for handling a plurality of moving cores, means for continuously applying simultaneously individual insulation upon the cores, means for turning the core thus insulated about its axis substantially 90 degrees, means for applying a further coating of insulation so that the second coating over-laps the seams in the first coating, a vulcanizing chamber, means for admitting a hot vulcanizing medium into the chamber, means for advancing the plurality of cores with individual insulation through the chamber while preventing the vulcanizing medium within the chamber from escaping.

3. In an apparatus for covering a core with a vulcanizable material, means for continuously applying simultaneously individual insulation upon the cores by the strip method whereby two seams are formed in the insulation, applying a second coating so that the seams in the first coating are over-lapped by the second coating, a vulcanizing chamber provided on its inlet end with a plurality of water glands supplied with pressure through which the cores in entering the vulcanizing chamber pass, the differential in pressure between any two adjacent glands to be under forty pounds pressure.

4. In an apparatus for covering a core by the strip method including means for covering a core with a coating of rubber by the strip method leaving two longitudinal seams in the insulation, means for turning the covering on the core upon the core thus coated upon its longitudinal axis, means for covering the core with an additional coating of rubber so that the seams of the first coating are covered by the second coating, and a vulcanizing chamber to cure the insulation.

5. In an apparatus for covering a core by the strip method including means for covering a core with a coating of strip rubber, means for turning the covering longitudinally upon the core thus coated, comprising a rotating roller having sawtoothed grooves, means for covering the core with an additional coating of strip rubber, and a vulcanizing chamber to cure the insulation.

6. In an apparatus for covering a core by the strip method including means for covering a core with a coating of strip rubber, means for turning the covering longitudinally upon the core thus coated comprising a corrugated roller rotated at an inclination to the axis of the core and acting on the coating to turn the coating, means for covering the core thus coated with an additional coating of rubber and a vulcanizing chamber to cure the insulation.

EARLE A. MITCHELL.
CHARLES F. MOODY.